United States Patent Office 3,778,441
Patented Dec. 11, 1973

3,778,441
IODOETHYNYL PYRIDINE COMPOUNDS
Urs Burckhardt, Basel, and Markus Zimmermann, Riehen, Switzerland, assignors to Ciba-Geigy Corporation, Ardsley, N.Y.
No Drawing. Filed Feb. 24, 1972, Ser. No. 229,173
Claims priority, application Switzerland, Mar. 5, 1971, 3,203/71
Int. Cl. C07d 31/24
U.S. Cl. 260—290                4 Claims

ABSTRACT OF THE DISCLOSURE

Iodoethynyl compounds of the formula $$R-C\equiv C-I$$

in which R denotes an aromatic six-membered ring containing 1, 2 or 3 nitrogen atoms, and which may have a fused benzene ring, the ring system being unsubstituted or substituted by one or more radicals, which may be the same or different, selected from lower alkyl, lower alkoxy, lower alkylthio, trifluoromethyl and amino groups and halogen atoms and their acid addition salts have useful antimicrobial activities; compositions containing such compounds and methods for protecting against microbial attack are provided; an illustrative embodiment is 2-methoxy-4-iodoethynylpyrimidine.

---

The present invention relates to iodoethynyl compounds, intermediate products and processes for their manufacture, as well as compositions which contain these compounds, and their use.

The present invention provides, as new compounds, iodoethynyl compounds of the general formula I $$R-C\equiv C-I \qquad (I)$$

in which R denotes an aromatic six-membered ring containing 1, 2 or 3 nitrogen atoms, and which may have a fused benzene ring, the ring system being unsubstituted or substituted by one or more radicals, which may be the same or different, selected from lower alkyl, lower alkoxy, lower alkylthio, trifluoromethyl and amino groups and halogen atoms. The invention also provides the acid addition salts of the compounds of the invention and processes for their manufacture.

In the general Formula I, when R represents an aromatic six-membered ring with 1, 2 or 3 nitrogen atoms, it may be, for example, a 2-, 3- or 4-pyridyl ring, a 3- or 4-pyridazinyl ring, a 2- or 4-pyrimidinyl ring, a 2- or 3-pyrazinyl ring or a 2-s-triazinyl ring, and when R represents an aromatic six-membered ring, with a fused benzene ring, it may be, for example, a 2-, 3- or 4-quinolinyl, a 1-, 3- or 4-isoquinolinyl, a 3- or 4-cinnolinyl, a 2- or 4-quinazolinyl or a 2- or 3-quinoxalinyl ring.

The ring systems mentioned can possess one or more of the above substituents, which may be the same or different, in addition to the iodoethynyl group.

The expression "lower alkyl groups" as well as the expressions "lower alkoxy groups" and "lower alkylthio groups" derived therefrom is used herein to mean alkyl groups with from 1 to 4 carbon atoms. These include methyl, propyl, isopropyl, butyl, isobutyl and tert.-butyl groups. The corresponding lower alkoxy and lower alkylthio groups include methoxy, ethoxy, propoxy, isopropoxy, butoxy, isobutoxy and tert. butoxy groups, and methylthio, ethylthio, propylthio, isopropylthio, butylthio, isobutylthio and tert.butylthio groups.

Methyl, ethyl, methoxy, ethoxy, methylthio and ethylthio groups are preferred.

The halogen atoms which may be present as substituents are fluorine, chlorine, bromine and iodine atoms, chlorine atoms being preferred.

The substituents mentioned are located on the carbon atoms of the ring systems mentioned.

The compounds of the general Formula I and their acid addition salts possess valuable antimicrobial, especially antibacterial and fungistatic, properties which make them suitable for use in human and veterinary medicine, and also for the protection of materials against microbes. The anti-microbial activity may be demonstrated in vitro in accordance with the incorporation test described by X. Bühlmann, W. A. Vischer and H. Bruhin, Zbl. Bakt. section I, originals, 180, 327–334 (1960). In this test, iodoethynyl compounds of the general Formula I in concentrations of from about 30 to about 100 μg./ml. are found to be active against a large number of Gram-positive and Gram-negative bacteria, for example, *Staphylococcus aureus, Escherichia coli, Salmonella typhi* and *pullorum, Proteus vulgaris* and *Klebsiella pneumonia*. The compounds of the invention are, furthermore, active against yeast fungi, for example, *Candida albicans*, in concentrations of from about 1 to about 100 μg./ml. and especially against dermatophytes, for example, *Trichophyton mentagrophytes*, in concentrations of from about 0.3 to about 10 μg./ml., as can be demonstrated by in vitro experiments in the incorporation test method. The compounds of the general Formula I prove active against trichophytosis in guinea pigs when administered locally in the form of 3% strength solutions. The iodoethynyl compounds of the invention and their acid addition salts are especially valuable because they show a very broad spectrum of action. In addition to the microbes already mentioned, they are active against many other bacteria and fungi, amongst which there may be mentioned the bacteria *Sarcina urea, Streptococcus faecalis* and *agalactiae, Coryne-bacterium diphterodies, Erysipelothrix rhusiopathiae, Bacillus subtilis, Mycobakterium phlei, Haemophilus gallinarium, Arizona paracolon, Pasteurella multicida, Brucella suis, Pseudomonas fluorescens* and *aeruginosa* and the fungi *Trichophyton gypseum, gallinae* and *verrucosum, Trichoderma viride, Fusarium oxysporum, Chaetomium globosum, Alternaria tenuis, Paecilomyces varioti, Stachybotrys atra, Pullularia pullulans, Coniophora cerebella, Poria raporia, Polystictus versicolor* and *Lenzites abiena*.

Amongst the compounds of the general Formula I, the iodoethynyl compounds of the Formulae I(a), I(b), I(c) and I(d)

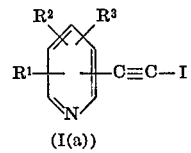
(I(a))

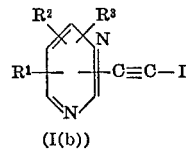
(I(b))

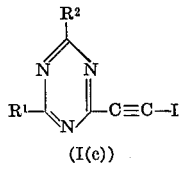
(I(c))

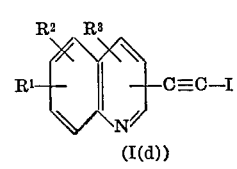
(I(d))

in which R¹, R² and R³, which may be the same or different, each represent a hydrogen or halogen atom, a lower alkyl, lower alkoxy, lower alkylthio, trifluoromethyl or amino group and their acid addition salts, are especially useful.

Individual compounds which are preferred because of their particularly good anti-microbial properties are the following: 2-iodoethynylpyridine, 3-iodoethynylpyridine, 4-iodoethynylpyridine, 2 - methoxy-4-iodoethynylpyrimidine, 2-ethoxy-4-iodoethynylpyrimidine, 2-chloro-4-iodoethynylpyrimidine, 2,4-dimethoxy-5-iodoethynyl-s-triazine and 3-iodoethynylquinoline and their acid addition salts.

In the abovementioned incorporation, test, 2-iodoethynylpyridine is active, for example, against *Escherichia coli* and *Staphylococcus aureus* in concentrations of about 33 μm./ml. against *Sporotrychum schenckii* in concentrations of about 1 μg./ml. and against *Trichophyton mentagrophytes* in concentrations of about 0.3 μl./ml.

According to a first process an iodoethynyl compound of the general Formula I and its acid addition salts are manufactured by iodinating an ethynyl compound of the general Formula II $$R—C\equiv C—Y \qquad (II)$$

in which R has the meaning mentioned under the general Formula I and Y denotes a radical which can be replaced by iodine. If desired, the resulting iodoethynyl compound of the general Formula I may be converted into an acid addition salt with a suitable organic or inorganic acid.

Suitable radicals Y which can be replaced by iodine are, for example, hydrogen atoms, cations, trimethylsilyl and carboxyl groups, suitable monovalent cations are, for example, ammonium cations and metal cations usually employed in organometallic reactions, for example, cations of the alkali metals, especially those of lithium, sodium and potassium, as well as of the monovalent transition metals, for example, of copper and silver. Suitable monovalent cations are also those derived from alkaline earth metals, for example, from calcium and magnesium, and those derived from the divalent transition metals, for example, from zinc and mercury. These include, for example, magnesium monohalides, for example, magnesium monochloride and monobromide, and zinc monohalides, for example, zinc monochloride and monobromide. Compounds of the general Formula II in which Y is a metal cation arise as intermediate products, for example, in the manufacture of ethynyl compounds of the general Formula II in which Y denotes a hydrogen atom.

The iodination is carried out in the presence of a base preferably by means of iodine. However, the iodine-potassium iodide complex, iodine cyanide, tosyl iodide and sodium hypoiodite can also be used. The reaction can be carried out in liquid ammonia, ether or another suitable solvent. The iodination is either carried out at the temperature of the liquid ammonia or, if a different solvent is used, at room temperature or above or below room temperature. Temperatures of from about 0° to about 30° C. are preferred in that case. If Y denotes a carboxyl group, the iodination may be carried out in a known manner by heating a propiolic acid compound falling within the general Formula II with iodine in benzene (compare Wieland et al., Ann. 446, page 67). The term "known" is used herein to mean in actual use in the art or described in the literature of the art. The isolation of the compounds of the general Formula I is effected according to known methods for example, by filtration, extraction and distillation (see, for example, H. G. Viehe, Chemistry of Acetylenes, Marcel Dekker Inc., 1969, page 685).

The starting compounds of the general Formula II are either known or can be manufactured according to processes known to be suitable for the manufacture of analogous compounds.

Thus, for example, compounds of the general Formula II, in which Y is hydrogen, can be manufactured for example, from compounds of the general Formula III, $$R—A \qquad (III)$$

in which R has the meaning mentioned under the general Formula I and A denotes an organic radical which can be converted into an acetylene group.

The radical A may be, for example, an atom grouping which can be converted into an acetylene group by dehydrohalogenation or dehalogenation. Such groupings, for example, possess the partial formulae

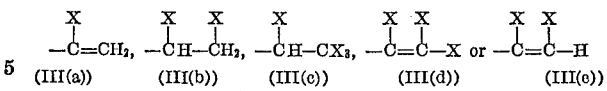
(III(a))    (III(b))    (III(c))    (III(d))    (III(e))

in which X denotes a halogen atom, especially a chlorine or bromine atom.

The elimination of a hydrohalic group takes place in a known manner under the influence of a strong base, for example, an amine hydroxide, carbonate, alcoholate amide or hydrazide of an alkali metal or an alkaline earth metal. The solvent used is liquid ammonia or an organic solvent, for example, an alcohol for example, methanol, ethanol, propanol, tert.-butanol; a diol, for example, ethylene glycol, propylene glycol or diethylene glycol or an ether, for example, diglym or monoglym. The reaction temperature is between room temperature and the boiling point of the solvent used. The groupings III and III(b) can, for example, be dehydrohalogenated by means of potassium hydroxide in tert. butanol to give an acetylene group. The grouping III(d) can, for example, be converted into an acetylene group by means of sodium or phenyl-lithium in ether, and the grouping III(e) by means of zinc or magnesium in ethanol. The grouping III(c) can first be converted into the grouping III(d) by means of aluminium chloride and then be treated further like the latter grouping. The dehydrohalogenation can also be carried out without the addition of a solvent, for example, by heating in powdered potassium hydroxide to from 150° to about 200° C.

A halogen-containing compound of the partial Formulae III(a) to III(e) may be manufactured in a manner which is in itself known, by halogenation of an acetyl compound of the general Formula IV,

in which R has the above meaning or of a vinyl compound of the general Formula V, $$R—CH=CH_2 \qquad (V)$$

in which R has the above meaning.

The acetyl group of the Formula IV, for example, is converted into the —CCl=CH$_2$ group by means of phosphorus pentachloride. The vinyl group of the Formula V, for example, is converted into the —CHBr—CH$_2$Br group by means of bromine. The vinyl group of a compound of the general Formula V can also be converted directly into the ethinyl group by dehydrogenation with lithium in an inert solvent, whereby the corresponding lithium-ethinyl compound falling within the general Formula II arises as an intermediate product.

The radical A in the general Formula III also encompasses the trimethylsilylethynyl grouping which can be converted into the ethynyl group by splitting off the trimethylsilyl group in a manner which is in itself known, for example, by means of an alkali, for example, sodium hydroxide, or by means of potassium fluoride or silver nitrate in an alcohol, for example, methanol. The manufacture of trimethylsilylethinyl compounds falling under the general Formulae II and III is described later.

The radical A in the general Formula III furthermore encompasses the propiolic acid radical —C≡C—COOH or an ester derived therefrom, which can be converted by decarboxylation or by saponification and decarboxylation, respectively, into an acetylene group in a known manner.

An ethynyl compound of the general Formula II can also be manufactured by a substitution reaction from a compound of the general Formula VI, $$R—X \qquad (VI)$$

in which R has the meaning mentioned under the general Formula I and X denotes a halogen atom, especially a chlorine, bromine or iodine atom, or a methylsulphinyl or methylsulphonyl group, and an organometallic compound of the general Formula VII,

$$M—C≡C—Y \qquad (VII)$$

in which Y has the meaning mentioned under the general Formula II and M denotes a monovalent metal cation.

Suitable monovalent metal cations are the metal cations usually employed in organometallic reactions, for example, those of the alkali metals, especially of lithium, sodium or potassium, as well as of the monovalent transition metals, for example, of copper and silver. Suitable monvalent cations are also the cations derived from inherently divalent alkaline earth metals, for example, from calcium and magnesium, as well as those derived from the divalent transition metals, for example, from zinc and mercury. These include, for example, magnesium monohalides, for example, magnesium monochloride and monobromide, or zinc monohalide, for example, zinc monochloride and monobromide. The substitution reaction is carried out in a suitable organic solvent, for example, in ether, dioxane or benzene, whilst maintaining temperatures between room temperature and the boiling point of the solvent used.

Intermediat products of the general Formula II(a)

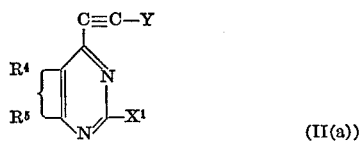

(II(a))

in which Y has the meaning mentioned under the general Formula II and $X^1$ denotes a hydrogen or halogen atom, or the trifluoromethyl group, and $R^4$ and $R^5$ independently of one another denote a lower alkyl, lower alkoxy, lower alkylthio, or trifluoromethyl group or a halogen or hydrogen atom or conjointly denote a benzene ring which is unsubstituted or substituted by one or more radicals, which may be the same or different selected from lower alkyl, lower alkoxy, lower alkylthio or trifluoromethyl groups or halogen atoms, are manufactured according to a further process according to the invention by reacting a compound of the general Formula VIII

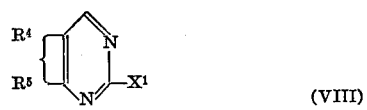

(VIII)

in which $X^1$, $R^4$ and $R^5$ have the meanings mentioned under the general Formula II(a), with an organometallic compound of the general Formula VII, and dehydrogenating the resulting addition compound of the general Formula IX

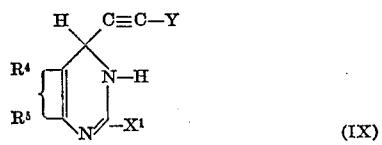

(IX)

in which $X^1$, $R^4$, $R^5$ and Y have the meanings mentioned under the general Formula II(a).

The dehydrogenation is carried out either immediately in situ or after isolation of the addition compound of the general Formula IX. The dehydrogenating agent is a quinone, especially chloranil, o-chloranil and 2,3-dichloro-5,6-dicyano-1,4-benzoquinone or palladium, but also an oxidising agent for example, a permanganate, for example, potassium permanganate, oxygen or a halogen atom, for example, a bromine or iodine atom. If an excess of iodine is used, iodination of the ethynyl grouping takes place simultaneously, yielding an iodoethynyl compound of the general Formula II(aa). The dehydrogenation is carried out in a suitable solvent, for example, in an alcohol, for example, methanol, ethanol, propanol or tert. butanol, in a ketone, for example, acetone, diethyl ketone or ethyl methyl ketone, in an ether, for example, diethyl ether or dioxane or tetrahydrofurane, in a hydrocarbon, for example, benzene, toluene or xylene, or in a halogenated hydrocarbon, for example, chloroform, methylene chloride or carbon tetrachloride, at temperatures between about room temperature and the boiling point of the solvent used. A preferred method of dehydrogenation is the treatment of a compound of the general Formula IX with chloranil in acetone.

4-ethynylpyrimidines of the general Formula II(b)

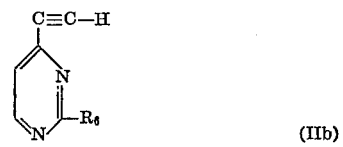

(IIb)

in which $R^6$ denotes a lower alkyl, lower alkoxy, lower alkylthio or amino group, may also be manufactured by reaction of a compound of the general Formula X

$$R^6—C=NH \qquad (X)$$

in which $R^6$ has the meaning mentioned under the Formula II(b), with diethynylketone. The reaction is carried out in a suitable solvent, advantageously in dimethylformamide or dimethylsulphoxide, at temperatures between —20° C. and room temperature.

The compounds of the general Formula II and substituted in the ring system by lower alkoxy, lower alkylthio and amino groups can be manufactured from the compounds of the general Formula II which are substituted in the ring system by a halogen atom, by replacing the halogen atom by the groups mentioned. In particular, chlorine can in this way be replaced by a methoxy, ethoxy, methylthio, ethylthio or amino group. The reaction takes place in a known manner, by treating the chlorine compound with methanol, ethanol or liquid ammonia or with the alkali alcoholate or alkali amide derived therefrom.

It is also possible first to replace a chlorine atom by an alkoxy group, after which the latter can be replaced by the amino group. If desired, the substitution reaction can be carried out with simultaneous iodination of the ethynyl group.

The abovementioned replacement processes are valuable, especially in the pyrimidine and s-triazine series, for the manufacture of iodoethynyl compounds having mixed substituents.

An ethynyl compound of the general Formula II in which Y is a hydrogen atom can be obtained from an organometallic compound or a trimethylsilylethynyl compound of the general Formula II by treatment with water or by alkaline saponification.

The ethynyl compound of the general Formula II, in which Y denotes a hydrogen atom or the trimethylsilyl group and their acid addition salts, also possess antibacterial and fungistatic actions, with the fungistatic properties predominating. In the incorporation tests mentioned, antibacterial effects are observed at concentrations of from about 10 to about 100 μg./ml. and fungistatic actions at concentrations of from about 0.3 to about 100 μg./ml. Especially useful compounds are those of the general Formulae II(b) and II(c)

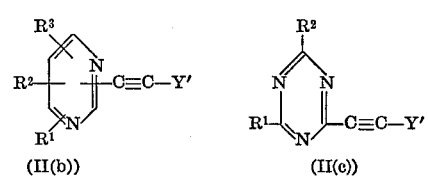

(II(b))    (II(c))

in which Y' denotes a hydrogen atom or a trimethylsilyl group and $R^1$, $R^2$ and $R^3$ have the meanings indicated under the general Formulae I(a), I(b) and I(c), and their acid addition salts.

Individual compounds to be singled out because of their antimicrobial action are the following:

4-ethynyl-2-chloropyrimidine,
4-ethynyl-2,5-dichloropyrimidine,
4-ethynyl-5-bromopyrimidine,
4-ethynyl-2-methoxypyrimidine,
2-chloro-4-trimethylsilylethynylpyrimidine,
1-amino-3-ethynyl-5-methoxy-s-triazine,
1-amino-3-ethynyl-5-methylthio-s-triazine and
1-methoxy-3-methylthio-5-trimethylsilylethynyl-s-triazine.

The compounds mentioned are particularly active against *Staphylococcus aureus, Escherichia coli, Klebsiella pneumoniae, Candida albicans, Trichophyton mentagrophytes, Salmonella typhi, Sporotrichum schenckii, Aspergillus fumigatus, Microsporium canis* and *Epidermophyton floccosum*.

The processes used for the manufacture of the intermediate products of the general Formula II in which an organometallic ethinyl compound of the general Formula VII is utilised, can also be employed for the direct manufacture of the iodoethynyl compounds of the general Formula I, using organometallic iodoethinyl compounds corresponding to the Formula VII.

According to a second process, an iodoethynyl compound of the general Formula I and its acid addition salts can be manufactured by reacting a compound of the general Formula VI with an organometallic compound of the general Formula VII(a)

in which M denotes a monovalent metal cation and if desired converting the resulting iodoethynyl compound of the general Formula I into an acid addition salt.

The organometallic iodoethynyl compound of the general Formula VII(a) are either known or can be obtained from the organometallic compounds of the general Formula VII by iodination in a known manner.

The reaction conditions already described earlier in connection with the synthesis of the compounds of the general Formula II are here observed in their general sense.

According to a third process an iodoethynyl compound of the general Formula II(a)

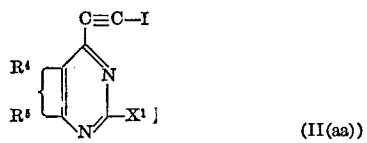

in which $X^1$, $R^4$ and $R^5$ have the meaning indicated under the general Formula II(a), and its acid addition salts, can be manufactured by reacting a compound of the general Formula VIII with an organometallic iodoethynyl compound of the general Formula VII(a), dehydrogenating the resulting iodoethynyl compound of the general Formula IX(a)

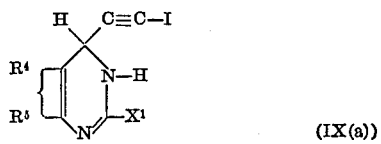

in which $X^1$, $R^4$ and $R^5$ have the meaning mentioned under the general Formula IX, and converting the resulting iodoethynyl compound of the general Formula II(aa) into an acid addition salt, if desired.

In this reaction, again, the reaction conditions described earlier in connection with the synthesis of the compounds of the general Formula II(a) are observed in their general sense.

According to a fourth process, an iodoethynyl compound of the general Formula X

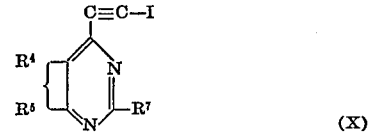

in which $R^4$ and $R^5$ have the meaning mentioned under the general Formula II(a) and $R^7$ denotes a lower alkoxy, lower alkylthio or amino group, and its addition salts, are manufactured by reacting an iodoethynyl compound of the general Formula XI

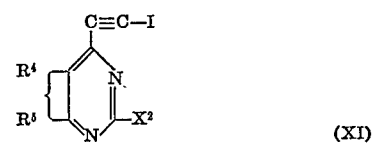

in which $R^4$ and $R^5$ have the meaning mentioned under the general Formula II(a) and $X^2$ denotes a chlorine, bromine or iodine atom, with an alkali metal salt of a compound of the general Formula XII $$R^7—H \qquad (XII)$$

in which $R^7$ has the meaning mentioned under the general Formula X, and, if desired, converting the resulting iodoethynyl compound of the general Formula X into an acid addition salt.

The reaction is preferably carried out in the alkanol or alkanethiol whose alkali salt is being reacted with the halogen compound, or in liquid ammonia if $R^7$ denotes an amino group. An inert solvent, for example, benzene, toluene, xylene, 1,2-dimethoxyethane, N,N-dimethylformamide, dimethylsulphoxide or hexamethylphosphoric acid triamide, can optionally be present in addition. The reaction can also be carried out in an inert solvent alone. The reaction generally takes place at room temperature but can be accelerated by warming to the boiling point of the solvent employed.

According to a fifth process, an iodoethynyl compound of the general Formula XIII

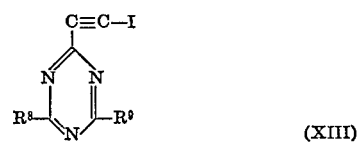

in which $R^8$ denotes a hydrogen or halogen atom or a lower alkoxy, lower alkylthio, trifluoromethyl or amino group and $R^9$ denotes a lower alkoxy, lower alkylthio or amino group, and its acid addition salts are manufactured by treating an iodoethynyl compound of the general Formula XIV

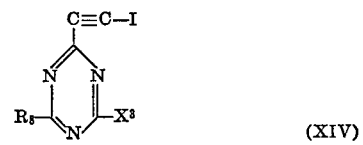

in which $R^8$ has the meaning mentioned under the general Formula XIII and $X^3$ denotes a halogen atom, a lower alkoxy or lower alkylthio group, with a lower alkanol, a lower alkanethiol or with ammonia and, if desired, converting the resulting iodoethylnyl compound of the general Formula XIII into an acid addition salt. In the general Formula XIV, $X^3$ as a halogen atom especially denotes a chlorine, bromine or iodine atom. The replacement of a halogen atom by a lower alkoxy or lower alkylthio group takes place at low temperatures, of about 0° C. to about 30° C. If at least two mols of the lower alkanol or lower alkanethiol are used, a second halogen atom R⁸ which may be present is also replaced. Equally, one or two halogen atoms can be replaced depending on whether one or two mols of ammonia are employed. If a starting compound of the general Formula XIV, in which R⁸ and X³ each denotes a lower alkoxy or lower alkylthio group, is treated with liquid ammonia, it proves possible to replace only one lower alkoxy or alkylthio group by the amino group, with the second lower alkoxy or alkylthio group not being replaced.

In particular, the fifth process is used to manufacture an iodoethylnyl compound of the general Formula XV

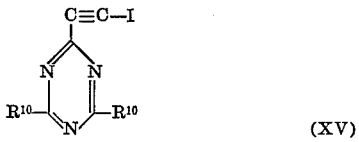

(XV)

in which R¹⁰ denotes a lower alkoxy, lower alkylthio or amino group, and its acid addition salts, by treating an iodoethynyl compound of the general Formula XVI

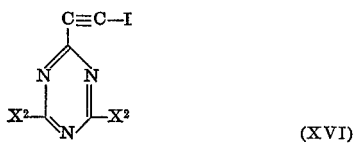

(XVI)

in which X² has the meaning mentioned under the general Formula XI, with a lower alkanol, lower alkanethiol or ammonia and, if desired, converting the resulting iodoethynyl compound of the general Formula XV into an acid addition salt.

The fifth process is furthermore used to manufacture an iodoethynyl compound of the general Formula XVII

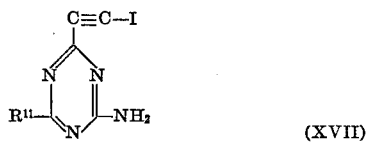

(XVII)

in which R¹¹ denotes a lower alkoxy or lower alkylthio group, and its acid addition salts, by treating an iodoethynyl compound of the general Formula XVIII

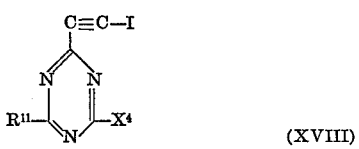

(XVIII)

in which R¹¹ has the meaning mentioned under the general Formula XVII and X⁴ denotes a lower alkoxy group or a halogen atom, with ammonia, and, if desired, converting the resulting iodoethynyl compound of the general Formula XVIII into an acid addition salt.

The exchange reactions described above can be carried out analogously with the ethynyl compounds of the general Formulae XIX, XX, XXI and XXII

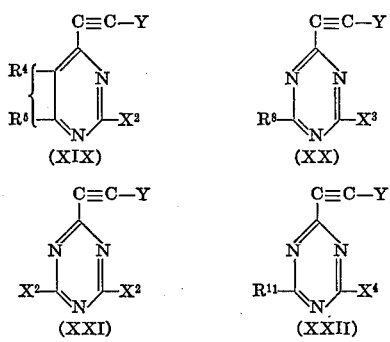

in which Y, R⁴, R⁵, R⁸, R¹¹, X², X³, and X⁴ have the above-mentioned meaning, thereby yielding the corresponding iodine-free ethynyl compounds of the general Formulae XXIII, XXIV, XXV and XXVI

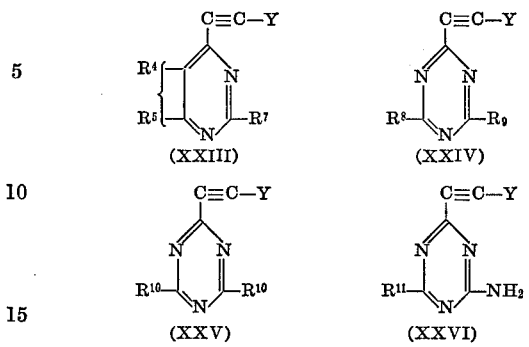

If the exchange reaction is carried out in an alkaline medium, a trimethylsilyl group which may be present is at the same time saponified.

The compounds of the general Formulae XIX, XX, XXI and XXII can also be converted directly into a corresponding iodoethynyl compound of the general Formulae X, XIII, XV and XVII by carrying out the exchange reaction in the presence of iodine.

According to a sixth process, an iodoethynyl compound of the general Formula I and its acid addition salts are obtained by heating a diiodoacrylic acid salt of the general Formula XXVIII,

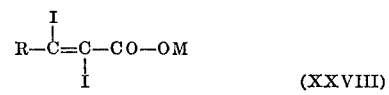

(XXVIII)

in which R has the meaning mentioned under the general Formula I and M has the meaning mentioned under the general Formula VII(a), to temperatures of between 50° and 100° and, if desired, converting the resulting iodoethynyl compound of the general Formula I into an acid addition salt.

The reaction is preferably carried out at about 70° C., with a silver salt of a compound of the general Formula XXVIII (compare Liebermann et al., Ber. 24, page 4,115; Peratone, Gazz. 22, II, pages 81 and 94).

The iodoethynyl compounds of the general Formula I are basic in character and therefore form addition salts with acids. The manufacture of the acid addition salts takes place in the usual manner by combining a compound of the general Formula I with a suitable acid in a non-polar solvent, for example, ether, benzene, hexane or mixtures thereof, and separating the salt formed, or in a polar solvent, for example, water, alcohol or mixtures thereof, and subsequently evaporating the solvent, whereupon the salt formed remains and can, if necessary, be further purified by recrystallisation. The choice of the acid used for the manufacture of the salt essentially depends on the end use of the salt. For purposes of purifying the compounds of the general Formula I, practically any acid which forms salts which crystallise well can be used. These include, for example, picric acid.

For medicinal purposes, physiologically tolerable salts are in particular used. As examples of such salts there may be mentioned those of the hydrohalic acids, sulphuric acids and phosphoric acids, of carboxylic acids and sulphonic acids, for example, formic, acetic, propionic, succinic, glycollic, lactic, malic, tartaric, citric, ascorbic, maleic, hydroxymaleic, pyruvic, phenylacetic, benzoic, p-aminobenzoic, anthranilic, p-hydroxybenzoic, salicylic, p-aminosalycylic, embonic, methanesulphonic, ethanesulphonic, hydroxyethanesulphonic, ethylenesulphonic, halogenobenzenesulphonic, toluenesulphonic, naphthalenesulphonic or sulphanilic acid. Essentially the same acids as are physiologically tolerable can be used for cosmetic and hygiene purposes. It is particularly advantageous to use acids which are themselves anti-microbially active, that is to say, for example, formic, benzoic, p-hydroxybenzoic, or salicylic acid.

The anti-microbial properties mentioned show that the compounds of the invention can be used extensively in human and veterinary medicine, in hygiene and cosmetics and in the protection of fabrics and organic materials. Their use for the treatment of skin diseases of warm-blooded animals caused by bacteria and fungi, and for the disinfection of the mouth, throat and intestine, is particularly valuable. They are preferably employed in the form of pharmaceutical or cosmetic preparations which comprise from about 0.1 to 5% of a compound of the general Formula I or of one of its physiologically tolerable or cosmetically acceptable acid addition salts and of the customary pharmaceutical or cosmetic carriers. For external use, for example, for disinfecting healthy skin, disinfecting wounds and treating dermatoses and effections of the mucous membranes caused by bacteria or fungi, ointments, powders, tinctures and sprays can in particular be used.

The ointment bases can be free of water and can, for example, comprise mixtures of wood grease and white petroleum jelly, or can be aqueous emulsions in which the active substance is suspended. Suitable carriers for powders are, for example, starches, for example, rice starch, which can, if desired, be given a lower specific gravity by adding highly disperse silica or a higher specific gravity by adding talc. Tinctures contain at least one iodoethynyl compound of the general Formula I or one of its physiologically tolerable or cosmetically acceptable acid addition salts in aqueous, especially from 45 to 75% strength ethanol, to which from 10 to 20% of glycerine have been added, if desired. For disinfection of healthy skin, in particular, it is also possible to use solutions which have been prepared with the aid of customary solubilising agents such as, for example, polyethylene glycol and of emulsifiers, if desired.

Suitable forms for disinfection of the mouth and throat are gargles or concentrates which comprise alcoholic solutions containing from about 1 to 5% of active substance to which glycerine and/or aroma substances can be added and also pastilles, that is to say, solid forms of unit doses with a relatively high content of sugar or similar substances and an active substance content of from about 0.2 to 20% together with the customary additives, for example, binders and aroma substances.

For intestinal disinfection, solid forms of dosage units, for example, tablets, dragées and capsules, may be used, and these preferably contain from 10% to 90% of an iodoethynyl compound of the general Formula I or one of its physiologically tolerable acid addition salts, in order to permit the administration of daily doses of from 0.1 to 2.5 g. to human adults or of suitably reduced doses to children. To manufacture tablets and dragées centres, the iodoethynyl compounds of the general Formula I or their physiologically tolerable acid addition salts are combined with one or more solid, pulverulent carriers, for example, lactose, sucrose, sorbitol, cornstarch, potato starch, amylopectin, cellulose derivatives or gelatine, preferably with the addition of a lubricant for example, magnesium stearate or calcium stearate or a polyethylene glycol of suitable molecular weight. Dragée centres are subsequently coated, for example, with concentrated sugar solutions, which can additionally contain, for example, gum arabic, talc and/or titanium dioxide, or with a lacquer dissolved in an easily volatilised organic solvent or solvent mixture. Dyestuffs can be added to these coatings, for example, to characterise different doses of active substances. Pearls (capsules sealed to give a pearl shape) and other sealed capsules comprise, for example, a mixture of gelatine and glycerine and contain, for example, a mixture of an iodoethynyl compound of the general Formula I or one of its acid addition salts, with polyethylene glycol. Push-fit capsules contain, for example, granules of an active substance together with a solid, pulverulent carrier, for example, lactose, sucrose, sorbitol, mannitol, starches, for example, potato starch, cornstarch or amylopectin, cellulose derivatives or gelatine, as well as magnesium stearate or stearic acid.

The iodoethynyl compounds of the general Formula I and their acid addition salts, which can be manufactured according to the invention, are of very diverse applicability for protecting organic materials and objects against attack by micro-organisms, especially by bacteria and fungi. Thus they can be directly incorporated into the material to be protected, for example, into materials based on synthetic resins, for example, polyamides and polyvinyl chloride, or into paper treatment liquors, print thickeners based on starch or cellulose derivatives, lacquers and paints which comprise, for example, casein, cellulose, viscose spinning composition, paper, animal mucins or oils, permanent layers based on polyvinyl alcohol, cosmetic articles, for example, soaps, for example, hand soaps or toilet soaps, ointments or powders. They can also be added to preparations of inorganic or organic pigments for the decorating trade, and to plasticisers.

Iodoethynyl compounds of the general Formula I can also be used in the form of their organic solutions, for example, as so-called "sprays," as dry cleaning agents or for impregnating timber, and in these cases the organic solvents which can be used are preferably water-immiscible solvents, especially petroleum fractions, but also water-miscible solvents, for example, lower alcohols, for example, methanol or ethanol or ethylene glycol monomethyl ether or monoethyl ether.

The compounds of the invention can also be used, together with a wetting agent or dispersing agent, in the form of their aqueous dispersions, for example, for protecting substances which tend to rot, for example, leather and paper.

Solutions or dispersions of the active substance, which can be used for protecting these materials, advantageously have an active substance content of at least 0.001 g./litre.

A preferred field of use of the iodoethynyl compounds of the general Formula I and of their acid addition salts is in the disinfection of laundry and the protection of laundry against attack by micro-organisms. For this, either washing liquors or rinsing liquors are used which contain the compounds mentioned, advantageously in concentrations of from about 1 to 200 μg./ml. relative to the liquor.

As detergent substances, the washing liquors contain, for example, anionic compounds, for example, aromatic sulphonic acids substituted by lipophilic groups, or their water-soluble salts, for example, the sodium salt of dodecylbenzenesulphonic acid, or water-soluble salts of sulphuric acid monoesters of higher-molecular alcohols or of their polyglycol ethers, for example, soluble salts of dodecyl alcohol-sulphate or of dodecyl alcohol polyglycol ether-sulphate. They may also contain alkali salts of higher fatty acids (soaps), and non-ionic detergent substances, for example, poly-glycol ethers of higher fatty alcohols, furthermore polyglycol ethers of higher-molecular alkylated phenols and as so-called "amphoteric" detergent substances, for example, reaction products of the alkali salts of lower halogeno-fatty acids with polyalkylenepolyamines containing lipophilic radicals, for example, with lauryldiethylenetriamine. In addition, the liquor can also contain customary auxiliaries, for example, water-soluble perborates, polyphosphates, carbonates, silicates, optical brighteners, plasticisers, salts which react acid, for example, ammonium silico-fluoride or zinc silicofluoride or certain organic acids, for example, oxalic acid, and also dressings, for example, those based on synthetic resin or starch.

The laundry which can be disinfected with washing liquors or rinsing liquors containing compounds according to the invention consists, above all of fibrous organic material, namely fibrous material of natural origin, for example, fibrous material containing cellulose, for example, cotton, or containing polypeptides, for example wool or silk, of fibrous material or synthetic origin, for example, fibrous material based on polyamide, poly-acrylonitrile or polyester or mixtures of the abovementioned fibres.

The iodoethynyl compounds which can be manufactured according to the invention and their acid addition salts, in the abovementioned concentrations impart extensive and persistent freedom from bacteria and fungi both to the liquor and to the laundry treated therewith.

The iodoethynyl compounds of the invention, and their acid addition salts, are also very effective against the bacterial flora which produces perspiration odour. Because of their low topical toxicity, they can, therefore, also be used as deodorising agents for laundry, for example, when incorporated into cleansing agents, for example into soaps or into shampoos, or as additives, for cosmetic agents, for example, ointments or creams.

In all forms, whether intended for industrial, cosmetic, hygienic or medicinal fields of application, iodoethynyl compounds of the general Formula I or their acid addition salts can be present as the sole active substances or combined with other known anti-microbial, especially anti-bacterial and/or anti-mycotic active substances, for example, in order to broaden the range of action. They can, for example, be combined with halogenated salicylic acid alkylamines and anilides, with halogenated diphenylureas, with halogenated benzoxazoles or benzoxazolones, with polychlorohydroxydiphenyl-methanes and polychlorohydroxydiphenyl-ethers, with halogenodihydroxydiphenylsulphides, with bactericidal 2 - imino-imidazolidines or 2-amino-tetrahydropyrimidines, with bactericidal quaternary compounds, with certain dithiocarbamic acid derivatives, for example, with tetramethylthiuram disulphide, with substiuted o-phenoxyphenyl esters, for example, 2-acetoxy-4,4'-dichlorodiphenylether or 2 - acetoxy-4,4'-trichlorodiphenyl-ether, or with phenyl-3-iodo-2-propynyl-ether or halogen-substituted derivatives thereof, for example, 2,3-dichloro-phenyl- or 2,4,5-trichlorophenyl-3-iodo-2-propynyl-ether. Combinations of compounds of the present application with a complex of iodine and a surface-active agent, with 2-hydroxy-2',4',4-trichlorodiphenyl-ether, with O,O' - bis[2-(2',4'-dichlorophenoxy)-5-chlorophenyl carbonic acid ester, dodecyl-di[β-hydroxyethyl)-benzylammonium chloride, 3 - trifluoromethyl-4,4'-dichloro-N,N'-diphenylurea, 5,6-dichlorobenzoxazol-2-one and with mixtures of trichlorobenzimidazoles and tetrachlorobenzimidazoles should particularly be singled out. The complexes of iodine and a surface-active agent which have been mentioned comprise a mixture of iodine and a surface-active agent, for example, an anionic agent, for example, sodium N-cyclohexyl-N-palmitoyltaurate, a sodium alkylbenzenesulphonate, or a sodium alkylarylsulphonate, a non-ionic agent, for example, nonylphenyl polyglycol ether or a polyoxypropylene glycol, or an amphoteric agent such as the bis-sodium compound of 1 - [2-hydroxyethyl)-1-(2-carboxyethyl)-2-undecyl-imidazolidine hydroxide. If appropriate, carriers with pharmacologically advantageous effects of their own can also be used, such as, for example, sulphur as a powder base or zinc stearate as a component of ointment bases.

The following examples illustrate the invention.

EXAMPLE 1

2-iodoethynylpyridine 700 ml. of dry ammonia are liquefied in a 1.5 litre sulphonation flask equipped with stirrer and solid carbon dioxide condenser, and are cooled to —75° C. 25.4 g. (0.1 mol) of iodine are added, followed by 10.3 g. (0.1 mol) of 2-ethynylpyridine [manufactured according to Leaver et al., J. Chem. Soc. 1963 (6053)]. The mixture is stirred for 3 hours at —35° C. 100 ml. of a 5% strength sodium thiosulphate solution are added whilst stirring and the product which precipitates is filtered off and washed twice with 15 ml. of water at a time. The crude product is dried in air and twice recrystallised from chloroform-petroleum ether, whereupon 2 - iodoethynylpyridine of melting point 127–128° C. is obtained.

EXAMPLE 2

3-iodoethynylpyridine

In the same manner as that indicated in Example 1, 24.1 g. of iodine (0.095 mol) and 9.8 g. (0.095 mol) of 3-ethynylpyridine [manufactured according to Haug and Fürst, Chem. Ber. 93, 593 (1960)] in 475 ml. of liquid ammonia yield 3-iodoethynylpyridine, melting point 135–137° C. (from methylene chloride-hexane).

EXAMPLE 3

4-iodoethynylpyridine

In the same manner as that indicated in Example 1, 2.89 g. of iodine (0.0114 mol) and 1.18 g. (0.0014 mol) of 4-ethynylpyridine [manufactured according to Gray et al., J. Org. Chem. 33, 3013 (1968)] in 100 ml. of liquid ammonia yield 4-iodoethynylpyridine. Melting point 210–215° C. (from chloroform).

EXAMPLE 4

5-ethyl-2-iodoethynylpyridine

In the same manner as that indicated in Example 1, 3.8 g. of iodine (0.0149 mol) and 1.95 g. of 5-ethyl-2-ethynyl-pyridine (0.0149 mol) and 1.95 g. 5 - ethyl-2-ethynyl-pyridine (0.0149 mol) in 70 ml. of liquid ammonia yield 5 - ethyl - 2 - iodoethynylpyridine, melting point 86–88° C. (from ether-hexane).

(a) The 5-ethyl - 2 - ethynyl-pyridine used as the starting material, boiling point 60–70° C./0.02 mm. Hg (bulb tube) is manufactured analogously to Example 5 (a) from 7.6 g. of 5 - ethyl - 2 - vinylpyridine (0.0571 mol) [manufactured according to Frank et al., J. Amer. Chem. Soc. 68, 1368 (1946)].

EXAMPLE 5

4,6-dimethyl-2-iodoethynylpyridine

In the same manner as that indicated in Example 1, 5.04 g. of iodine (0.0198 mol) and 2.6 g. (0.0198 mol) of 2 - ethynyl - 4,6 - dimethylpyridine in 200 ml. of liquid ammonia, yield 4,6 - dimethyl - 2 - iodoethynylpyridine, melting point 159° C. (with decomposition) (from ether-hexane).

The 2-ethynyl - 4,6 - dimethyl-pyridine used as the starting material is manufactured as follows:

(a) 20.7 g. (0.129 mol) of bromine in 50 ml. of carbon tetrachloride are first introduced into a 250 ml. three-neck flask equipped with a magnetic stirrer. A solution of 15 g. of 2 - vinyl - 4,6 - dimethylpyridine (0.113 mol) [manufactured according to F. Melichlor, Chem. Ber. 88, 1208 (1955)] in 30 ml. of carbon tetrachloride is added dropwise at 0–5° C. over the course of 30 minutes, whilst stirring well. The dark mixture is warmed to room temperature, the brown syrup is decanted and the yellow solution is evaporated. The residue is dissolved in 30 ml. of tert. butanol.

120 ml. of tert. butanol and 0.1 g. of hydroquinone are heated to the boil in a 250 ml. three-neck flask equipped with magnetic stirrer and reflux condenser. 17 g. of powdered 85% strength potassium hydroxide (0.270 mol) are added whilst stirring. The solution, described above, of the dibromide in tert butanol is added to the greenish-brown mixture over the course of 30 minutes under reflux, and whilst stirring. The mixture is stirred for a further 1.5 hours under reflux and diluted with 200 ml. of ether, and the reaction mixture is filtered through Hyflo filter paper. The filtrate is washed 3 times with 50 ml. of water at a time and the aqueous phases are in each case extracted twice with 100 ml. of ether at a time. The combined organic phases are dried over 30 g. of anhydrous sodium sulphate and filtered, and the filtrate is evaporated to dryness. The residue is distilled in a bulb tube at 0.01 mm. Hg and a temperature of 60–80° C. and yields 7.9 g. of a yellow crude product. This is suspended in water and treated with 338 ml. of a 5% strength aqueous solution of silver nitrate (0.1 mol). The white precipitate is filtered off and washed with 100 ml. of water. The filter residue is digested with 60 ml. of a 2 N aqueous hydrochloric acid solution and the precipitate is filtered off. The filtrate is adjusted to pH 10 with an aqueous 2 N sodium hydroxide solution and the aqueous phase is extracted by shaking 3 times with 200 ml. of ether at a time. The combined ether phase is dried over 30 g. of anhydrous sodium sulphate and filtered, and the filtrate is evaporated to dryness. 2-ethynyl-4,6 - dimethylpyridine of boiling point 60° C./0.02 mm. Hg (bulb tube), melting point approx. 15° C., is obtained.

EXAMPLE 6

2-chloro-4-iodoethynylpyrimidine

In the same manner as that indicated in Example 1, 31.4 g. of iodine (0.123 mol) and 17.1 g. of 4-ethynyl-2-chloropyrimidine (0.123 mol) in 400 ml. of liquid ammonia yields 2 - chloro - 4 - iodoethynylpyrimidine, melting point 194–195° C. (from acetone).

The 4-ethynyl - 2 - chloropyrimidine used as the starting material is prepared in the following manner:

(a) 2-chloro - 4 - ethynyl - 3,4 - dihydropyrimidine: 1 l. of anhydrous ammonia is condensed in a dry 2 l. sulphonation flask equipped with stirrer, solid carbon dioxide condenser, thermometer and dropping funnel. 250 mg. of anhydrous iron chloride are added and 14.97 g. of sodium (0.65 mol) are introduced in portions in such a way that only after the blue colour has disappeared is a new portion of sodium added. The sodium amide thus obtained is kept under reflux (—33° C.) for 30 minutes, after which acetylene is passed in for 1 hour.

The suspension of sodium acetylide thus obtained is cooled to —60° C. whilst stirring. A solution of 60 g. of 2 - chloropyrimidine (0.52 mol) (Org. Synth. Coll., vol. 4, 182) in 300 ml. of absolute ether is added dropwise over the course of 30 minutes by means of the dropping funnel. The mixture is stirred for 4 hours under reflux (—35° C.). 40 g. of ammonium chloride (0.75 mol) are added in portions and the ammonia is evaporated. 300 ml. of water are added to the residue. The precipitate is filtered off, washed with 50 ml. of ether and dried in a desiccator over calcium chloride. The water phase is extracted three times with 200 ml. of ether at a time and the combined ether extracts are dried over 20 g. of anhydrous sodium sulphate, filtered and evaporated to dryness. The residue is combined with the first residue and yields crude 2-chloro-4-ethynyl - 3,4-dihydropyrimidine.

A sample is sublimed at 90° C./10$^{-3}$ mm. Hg and recrystallised from methanol-water, and yields 2-chloro-4 - ethynyl - 3,4 - dihydropyrimidine, melting point 115–116° C. (with decomposition).

(b) 4-ethynyl - 2 - chloro-pyrimidine: 86.6 g. of the crude product of 2-chloro - 4 - ethynyl - 3,4 - dihydropyrimidine in 2 l. of acetone are first introduced into a 2.5 l. sulphonation flask equipped with reflux condenser and stirrer and 180 g. of chloraninil (0.733 mol) are added in portions over the course of 30 minutes at room temperature, whilst stirring, whereupon the temperature of the mixture rises to 40° C. The mixture is stirred for a further hour and the solvent is removed in vacuo at 20–30° C. The residue is sublimed at 80–90° C./12 mm. Hg. The sublimate is recrystallised from ether and yields 4-ethynyl - 2 - chloro-pyrimidine, melting point 132–134° C.

4-ethynyl - 2 - chloropyrimidine can also be obtained from the 2-chloro - 4 - trimethylsilylethynyl-pyrimidine described in Examples 20 and 21 by splitting off the trimethylsilyl group.

EXAMPLE 7

4-iodoethynyl-2-methoxypyrimidine

In the same manner as that indicated in Example 1, 30.4 g. of iodine (0.1195 mol) and 16.0 g. of 4-ethynyl-2-methoxypyrimidine (0.1195 mol) in 1.1 l. of liquid ammonia yield 4-iodoethynyl-2-methoxypyrimidine, melting point approx. 180° C. (with decomposition) (from methylene chloride).

The 4-ethynyl-2-methoxy-pyrimidine required as the starting material is manufactured as follows:

(a) In a 3-neck flask equipped with magnetic stirrer rod, thermometer and gas inlet tube, a solution of 2.0 g. (0.0145 mol) of 4-ethynyl-2-chloropyrimidine [for manufacture, see Example 6(b)] in 40 ml. of anhydrous methanol is stirred under a nitrogen atmosphere and cooled to between —20 and —35° C.

A solution of sodium methylate in 15 ml. of anhydrous methanol [prepared from 0.35 g. of sodium (0.0152 mol)] is added all at once. The mixture is stirred at —10° C. for 1 hour, at 0° C. for 3 hours and at 10° C. for 1 hour. The methanolic, slightly violet solution is poured onto 250 g. of ice and the aqueous solution is extracted four times with 100 ml. of benzene at a time. The combined benzene phases are dried over 50 g. of anhydrous calcium chloride and filtered, and the filtrate is evaporated to dryness on a rotary evaporator. The residue is recrystallised from hexane and yields 4-ethynyl-2-methoxypyrimidine, melting point 106–107° C.

(b) 4-ethynyl-2-methoxypyrimidine can also be manufactured as follows:

A mixture of 2.20 g. of o-methyl-isourea bisulphate (0.01275 mol), 2.14 g. of sodium bicarbonate (0.0255 mol) and 5 ml. of dimethylformamide is stirred in a 50 ml. three-neck flask equipped with stirrer and thermometer, at —10° C. under nitrogen. A solution of 0.99 g. of diethynylketone (0.01275 mol) [freshly manufactured according to Ziegenbein, Ber. 96, 2511 (1963)] in 15 ml. of dimethylformamide is added all at once at —10° C. The mixture is stirred for 30 minutes at —10° C. and then for 20 hours at 0° C. The mixture is poured onto 50 ml. of ice water and 100 ml. of ether and the phases are separated. The ether phase is extracted four times with 10 ml. of water at a time, dried over 5 g. of anhydrous sodium sulphate and filtered, and the filtrate is evaporated to dryness. The residue is purified by chromatography on a chromatography column prepared from 40 g. of silica gel in hexane-ether (10:1). Elution with 250 ml. of hexane-ether (1:1) yields 4-ethynyl-2-methoxypyrimidine.

EXAMPLE 8

2,4-dimethoxy-6-iodoethynyl-s-triazine

In the same manner as that indicated in Example 1, 4.46 g. of iodine (0.0176 mol) and 2.9 g. of 2-ethynyl-4,6-dimethoxy-s-triazine (0.0176 mol) in 100 ml. of liquid ammonia yields 2,4-dimethoxy-6-iodoethynyl-s-triazine, melting point 195° C. (with decomposition) (from methylene chloride-hexane).

The 2-ethynyl-4,6-dimethoxy-s-triazine required as the starting material is obtained in the following manner:

(a) 2,4-dichloro - 6 - (trimethylsilylethynyl)-s-triazine: A solution of ethylmagnesium bromide [from 22.4 g. of magnesium (0.92 mol) and 110 g. of ethyl bromide (1.01 mol)] in 300 ml. of absolute tetrahydrofuran is added dropwise at room temperature, over the course of 1 hour, to a solution of 90.4 g. of trimethylsilylacetylene (0.92 mol, manufactured according to U.S. 2,887,371) in 300 ml. of tetrahydrofuran, in a 2 l. sulphonation flask equipped with stirrer and reflux condenser, whilst stirring and under a nitrogen atmosphere. The temperature of the solution rises to 36° C. and the solution was stirred for 1 hour at 45° C. and transferred under nitrogen into a 1 l. dropping funnel. A solution of 154 g. of cyanuric chloride (0.835 mol) in 800 ml. of absolute tetrahydrofurane is first introduced into the sulphonation flask and the Grignard solution is added dropwise over the course of 2 hours at room temperature, under a nitrogen atmosphere and whilst stirring. The brown solution is stirred for 16 hours at room temperature and added to a solution of 67 g. of ammonium chloride (1.25 mols) in 300 ml. of ice water. The phases are separated, the tetrahydrofuran solution is dried over 30 g. of anhydrous sodium sulphate and filtered, and the filtrate is evaporated to dryness. The residue is purified by chromatography on a chromatography column prepared from 3 kg. of silica gel in hexane. Elution with hexane-ether yields an oil which after distillation yields 2,4-dichloro-6-(trimethylsilylethynyl)-s-triazine. Boiling point 72–73° C./0.001 mm. Hg.

(b) 2,4-dimethoxy - 6 - (trimethylsilylethynyl) - s - triazine: 40 g. of 2,4-dichloro-6-(trimethylsilylethynyl)-s-triazine (0.163 mol) are added dropwise over the course of 20 minutes at 0° C., whilst stirring, to 400 ml. of absolute methanol in a 1 l. three-neck flask equipped with a magnetic stirrer. The solution is stirred for 1 hour at 0° C. and 3 hours at room temperature and is added to 2 litres of ice water, and the aqueous solution is extracted by shaking with 3 litre portions of methylene chloride. The combined methylene chloride phases are dried over 100 g. of anhydrous calcium chloride and filtered, and the filtrate is evaporated to dryness. The residue is crystallised from hexane and yields 2,4-dimethoxy-6-(trimethylsilylethynyl)-s-triazine, melting point 69–71° C.

(c) 2-ethynyl-4,6-dimethoxy-s-triazine: A solution of 30 g. of 2,4-dimethoxy - 6 - (trimethylsilylethynyl)-s-triazine (0.0975 mol) in 300 ml. of methanol, in a 500 ml. three-neck flask equipped with a magnetic stirrer, is treated at room temperature with 7.5 ml. of an 0.1 N aqueous sodium hydroxide solution (0.00075 mol) whilst stirring. After 10 minutes, 2 hours and 3 hours, 7.5 ml. of an 0.1 N aqueous sodium hydroxide solution are again added (total 0.003 mol). The solution is added to 1.5 l. of ice water and extracted with 3.1 l. portions of benzene. The combined benzene phases are dried over 100 g. of anhydrous calcium chloride and filtered, and the filtrate is evaporated to dryness. The residue is recrystallised from methylene chloride-hexane and yields 2-ethynyl-4,6-dimethoxy-s-triazine, melting point 172–173° C.

EXAMPLE 9

2-iodoethynyl-4-methoxy-6-methylthio-s-triazine

In the same manner as that indicated in Example 1, 5.0 g. of iodine (0.02 mol) and 3.6 g. of 2-ethynyl-4-methoxy-6-methylthio-s-triazine (0.02 mol) in 100 ml. of liquid ammonia yield 2-iodoethynyl-4-methoxy-6-methylthio-s-triazine, melting point 186° C. (with decomposition) (from tetrahydrofuran-water).

The 2 - ethynyl - 4 - methoxy-6-methylthio-s-triazine required as the starting material is manufactured as follows, analogously to the reaction sequence indicated in Example 8:

(a) 2 - chloro-4-methylthio-6-(trimethylsilylethynyl)-s-triazine: In the same manner as that indicated in Example 8(a), 49 g. of trimethylsilylacetylene (0.50 mol) and 89 g. of methylthio-dichloro-s-triazine (0.454 mol) yields 2 - chloro-4-methylthio-6-(trimethylsilylethynyl)-s-triazine, melting point 69–71° C., boiling point 100–103° C./0.0001 mm. Hg.

(b) 2-methoxy-4-methylthio-6-(trimethylsilylethynyl)-s-triazine: In the same manner as that indicated in Example 8(b), 54 g. of 2-chloro-4-methylthio-6-(trimethylsilylethynyl)-s-triazine (0.209 mol) yields 2-methoxy-4-methylthio-6-(trimethylsilylethynyl) - s - triazine, melting point 75–78° C. (from hexane).

(c) 2-ethynyl-4-methoxy-6-methylthio-s-triazine: In the same manner as that indicated in Example 8(c), 40 g. of 2-methoxy-4-methylthio - 6 - (trimethylsilylethynyl)-s-triazine (0.158 mol) yield 2-ethynyl-4-methoxy-6-methylthio-s-triazine, melting point 162–164° C. (from acetone-hexane).

EXAMPLE 10

2-amino-4-iodoethynyl-6-methoxy-s-triazine 1.45 g. of 2,4-dimethoxy - 6 - iodoethynyl - s - triazine (0.00498 mol) (for manufacture, see Example 8) are added to 100 ml. of dry, liquid ammonia in a 300 ml. sulphonation flask equipped with stirrer and solid carbon dioxide condenser. The mixture is stirred for 16 hours at —35° C. The ammonia is evaporated. The residue is recrystallised from acetone-hexane and yields 2-amino-4-iodoethynyl-6-methoxy-s-triazine, melting point 200° C. (with decomposition).

EXAMPLE 11

2-amino-4-iodoethynyl-6-methylthio-s-triazine

In the same manner as that indicated in Example 10, 1.5 g. of 2-iodoethynyl-4-methoxy-6-methylthio-s-triazine (0.005 mol) (for manufacture, see Example 9) yield 2-amino-4-iodoethynyl-6-methylthio - s - triazine, melting point 206° C. (with decomposition) (from acetone-hexane).

EXAMPLE 12

2-amino-4-iodoethylnyl-6-methoxy-s-triazine

In a 750 ml. sulphonation flask equipped with stirrer and solid carbon dioxide condenser, 300 ml. of dry ammonia are liquefied and cool to —75° C., and treated with 7.62 g. of iodine (0.03 mol) and subsequently with 4.96 g. of 2-ethynyl-4,6-dimethoxy-s-triazine (0.03 mol) [for manufacture, see Example 8(c)]. The mixture is stirred for 48 hours at —35° C. 71.5 ml. of a 5% strength aqueous sodium thiosulphate solution are added and the ammonia is evaporated. The precipitate is filtered off, twice washed with 15 ml. of water at a time and dried in air. The crude product is recrystallised from acetone-hexane and yields 2 - amino-4-iodoethynyl-6-methoxy-s-triazine, melting point 210° C. (with decomposition).

EXAMPLE 13

2-amino-4-iodoethinyl-6-methylthio-s-triazine

In the same manner as that indicated in Example 12, 5.0 g. of iodine (0.02 mol) and 3.6 g. of 2-ethynyl-4-methoxy-6-methylthio-s-triazine (0.02 mol) [for manufacture, see Example 9(c)] yields 2-amino-4-iodoethynyl-6-methylthio-s-triazine, melting point 211° C. (with decomposition) (from acetone-hexane).

EXAMPLE 14

2-ethoxy-4-iodoethynyl-pyrimidine

A solution of sodium ethylate in ethyl alcohol is prepared by adding 1.44 g. of sodium (0.0626 mol) to 40 ml. of absolute alcohol, and is cooled in an ice bath. In a 500 ml. 3-neck round flask equipped with a magnetic stirrer, 15 g. of 2-chloro-4-iodoethylnyl-pyrimidine (0.0569 mol) (see Example 6) are dissolved in 200 ml. of warm 1,2-dimethoxyethane and the solution is cooled in an ice bath, whilst stirring magnetically, resulting in the reprecipitation of the starting material. The solution of sodium ethylate in ethanol is added all at once at 5–8° C. The precipitate dissolves immediately. The mixture is stirred for 1 hour at room temperature and poured onto 100 g. of ice. The mixture is extracted 3 times with 300 ml. of methylene chloride at a time, the methylene chloride phases are each washed once with 30 ml. of water, combined, and dried over 30 g. of anhydrous sodium sulphate and filtered, and the filtrate is evaporated to dryness on a rotary evaporator. The residue is recrystallised from 150 ml. of methylene chloride and yields 4.8 g. of 2-ethoxy-4-iodoethynylpyrimidine, melting point 165° C. (with decomposition).

The examples which follow describe the synthesis of further ethinyl compounds which can also be converted into the corresponding iodoethynyl compounds as described in Example 1.

EXAMPLE 15

5-bromo-4-ethynyl-pyrimidine

In the same manner as that described in Example 6(a), 0.832 g. of sodium (0.0362 mol) and 5.0 g. of 5-bromopyrimidine (0.0314 mol) [manufactured according to Bredereck, Chem. Ber. 91, 2848 (1958)] and acetylene yield a crude product of 5-bromo-4-ethynyl-3,4-dihydropyrimidine which is dehydrogenated with 6.92 g. of chloranil in the same manner as that indicated in Example 6(b) and after sublimation and recrystallisation yields 5-bromo-4-ethynyl-pyrimidine, sublimation temperature 60–70° C./10 mm. Hg, melting point 81–82° C.

EXAMPLE 16

4-ethynyl-2,5-dichloropyrimidine

In the same manner as that described in Example 6(a), 1.93 g. of sodium (0.084 mol), 10 g. of 2,5-dichloropyrimidine (0.067 mol [manufactured according to English et al. JACS 68, 1048 (1946)] and acetylene yield 4 - ethylnyl-2,5-dichloro-3,4-dihydropyrimidine, melting point 129° C. (with decomposition).

In the same manner as that indicated in Example 6(b) 6.0 g. of 4-ethynyl-2,5-dichloro-3,4-dihydropyrimidine (0.0344 mol) and 12.5 g. of chloranil (0.0508 mol) after double sublimation at 120° C./0.1 mm. Hg yield 3.4 g. of 4-ethynyl-2,5-dichloropyrimidine, melting point 128° C.

EXAMPLE 17

4-ethynyl-2-trifluoromethylpyrimidine

In the same manner as that described in Example 6(a), 1.01 g. of sodium (0.044 mol), 5.9 g. of trifluoromethylpyrimidine (0.034 mol) and acetylene yield 4-ethynyl-2-trifluoro-methyl-3,4-dihydropyrimidine, sublimation temperature 90° C./0.01 mm. Hg, melting point 157–157.5° C. (from ether-hexane).

In the same manner as that indicated in Example 6(b), 1.6 g. of 4-ethynyl - 2 - trifluoromethyl - 3,4 - dihydropyrimidine (0.0092 mol) and 2.56 g. of chloranil (0.0104 mol) yield, after sublimination at 60–70° C./10 mm. Hg and preparative thin layer chromatography, 4-ethynyl-2-trifluoromethylpyrimidine of melting point 66–67° C.

The 2-trifluoromethyl-pyrimidine required as the starting material is manufactured as follows:

(a) 60 g. of 2-trifluoromethyl-pyrimidine-4-thiol (0.30 mol) [manufactured according to Inoue, J. Org. Chem. 26, 4504 (1961)] in one litre of water are first introduced into a 2 l. sulphonation flask equipped with stirrer and reflux condenser, 120 ml. of an aqueous 30% strength ammonia solution are added whilst stirring and the solution is warmed to 80° C. 200 g. of Raney nickel (wet paste) are added in 3 portions, whilst stirring well. The mixture is warmed under reflux for 2 hours and filtered through a Celite filter cake. The residue is twice washed with 200 ml. of methylene chloride at a time and discarded. The aqueous phase is extracted by shaking with three 300 ml. portions of methylene chloride. The methylene chloride phases are combined, dried over 20 g. of anhydrous sodium sulphate and filtered. The filtrate is evaporated to dryness and after a distillation in a bulb tube at 10 mm. Hg, bath temperature 60° C. yields 2-trifluoromethylpyridine.

EXAMPLE 18

Ethynyl-trichloropyrimidine 98.6 g. of tetrachloropyrimidine (0.454 mol) are dissolved in 200 ml. of anhydrous tetrahydrofuran in a 1 l. sulphonation flask equipped with stirrer, reflux condenser and dropping funnel, at room temperature, whilst stirring. A solution of ethynyl-magnesium bromide [manufactured from 12 g. of Mg (0.5 mol) according to Org. Synth. Coll. Vol. 4, 792] in 400 ml. of absolute tetrahydrofuran is added dropwise over the course of one hour. The mixture is stirred for 16 hours at room temperature, then warmed under reflux for 3 hours, and left to stand for 5 days. The contents of the flask are added to a solution of 32.1 g. of ammonium chloride (0.6 mol) in 600 ml. of ice water, the mixture is filtered through a Celite filter cake and the residue is twice washed with 200 ml. portions of ether and discarded. The aqueous phase is twice extracted by shaking with 500 ml. portions of ether. The organic phases are combined, dried over 30 g. of anhydrous sodium sulphate and filtered, and the, filtrate is evaporated to dryness. The residue is distilled in a bulb tube at 12 mm. Hg, bath temperature 100° C., and yields a distillate which is purified by chromatography on silica gel. Elution with hexane-ether (30:1) first yields back a part of the starting material (0.092 mol) and further elution with hexane-ether (25:1) yields a crude product which after recrystallisation from hexane yields ethynyl-trichloropyrimidine, melting point 129–131° C.

EXAMPLE 19

Trichloro-(trimethylsilylethynyl)-pyrimidine

A solution of 43.4 g. of tetrachloropyrimidine (0.20 mol) in 100 ml. of absolute tetrahydrofurane is stirred in a 750 ml. sulphonation flask equipped with reflux condenser, stirrer and gas inlet tube, under a nitrogen atmosphere, at room temperature. A solution of trimethylsilylethynyl-magnesium bromide in 200 ml. of absolute tetrahydrofurane [manufactured from 19.6 g. of trimethylsilylacetylene (0.20 mol) according to U.S. Pat. No. 2,887,371] is added dropwise over the course of 20 minutes whilst stirring and the mixture is stirred for 3 days at room temperature. The contents of the flask are added to a solution of 50 g. of ammonium chloride in 200 ml. of ice water, and 500 ml. of ether are added. The phases are separated and the aqueous phase is extracted once with 300 ml. of ether and discarded. The organic phases are combined and washed twice with water and once with a concentrated aqueous solution of sodium chloride. The organic phases are dried over 30 g. of anhydrous sodium sulphate and filtered, and the filtrate is evaporated to dryness on a rotary evaporator. The residue is fractionally distilled through a 12 cm. Vigreux column, yielding trichloro-(trimethylsilylethynyl)-pyrimidine, boiling point 81–86° C./0.0001 mm. Hg. melting point 30–35° C. According to an analysis by gas chromatography and according to the nuclear resonance spectrum, the product is a mixture of two positional isomers in the ratio of 1:1.

Trichloro - ethynyl - pyrimidine can be manufactured therefrom by splitting off the trimethylsilyl group as indicated in Example 8(c).

EXAMPLE 20

2-chloro-4-(trimethylsilylethynyl)-pyrimidine

A suspension of sodium amide [produced from 5.82 g. of sodium (0.253 mol)] in 400 ml. of condensed ammonia is prepared in a 750 ml. sulphonation flask equipped with stirrer, solid carbon dioxide condenser and dropping funnel. 32.1 g. of trimethylsilylacetylene (73.8% strength, 0.241 mol) (manufactured according to U.S. 2,887,371) are added at —35° C. whilst stirring. The suspension is cooled to —80° C. and a solution of 26.6 g. of 2-chloropyrimidine in 200 ml. of absolute ether is added over the course of 5 minutes. The mixture is stirred for 3 hours at —50° C. to —40° C. 16 g. of ammonium chloride (0.3 mol) are added in portions, the solid carbon dioxide condenser is replaced by a water condenser and the ammonia is evaporated. 100 ml. of water are added and the mixture is filtered. The residue is twice washed with 50 ml. portions of ether and discarded. The phases are separated and the aqueous phase is extracted once with 100 ml. of ether. The combined ether phase is dried over 20 g. of anhydrous sodium sulphate and filtered, and the filtrate is evaporated to dryness on a rotary evaporator. The crude product thus obtained is dissolved in 200 ml. of acetone in a 500 ml. three-neck flask equipped with thermometer and magnetic stirrer. 30.9 g. of chloranil (0.126 mol) are added in portions whilst stirring, in the course of which the temperature of the mixture rises to 53° C. The mixture is stirred for a further 30 minutes and the solvent is evaporated off. The residue is taken up in 500 ml. of ether and filtered. 100 g. of ice and 60 ml. of an aqueous 2 N sodium hydroxide solution are added to the filtrate. The phases are separated and the ether phase is washed with five 30 ml. portions of a 2 N sodium hydroxide solution and with three 30 ml. portions of water.

The ether phases are combined, dried over 30 g. of sodium sulphate and filtered, and the filtrate is evaporated to dryness. The residue is purified by chromatography on a chromatography column prepared from 500 g. of silica gel in hexane-ether (3:1). Elution with hexane-ether, 2:1, gives a product which after distillation in a bulb tube at $10^{-3}$ mm. Hg, bath temperature 80° C., and crystallisation from hexane, yields 2-chloro-4-(trimethylsilylethynyl)-pyrimidine, melting point 65–66° C.

The subsequent fractions from the chromatography yield a crude product which after recrystallisation from methylene chloride-ether-hexane yields the 4-ethynyl-2-chloropyrimidine already described in Example 6(b), melting point 131–132° C.

4-ethynyl-2-chloropyrimidine can be obtained from the 2-chloro-4-(trimethylsilylethynyl)-pyrimidine by splitting off the trimethylsilyl group as in Example 8(c).

EXAMPLE 21

2-ethynylpyrimidine

If the reaction described in Example 6(a) is carried out with 15.87 g. of 2-sulphonylmethylpyrimidine (0.100 mol) [manufactured according to D. J. Brown and P. W. Ford, J. Chem. Soc. (c) 1967, 571] and 0.144 mol of sodium acetylide in liquid ammonia, 2-ethynylpyrimidine is obtained, melting point 96–97° C. (from cyclohexane).

In the same manner, 2-ethynylpyrimidine is obtained from 14.22 g. of 2-sulphinylmethylpyrimidine (0.100 mol) [manufactured acording to D. J. Brown and P. W. Ford, J. Chem. Soc. (c) 1967, 571] and 0.144 mol of sodium acetylide in liquid ammonia.

EXAMPLE 22

2-ethynyl-4,6-diethoxy-s-triazine

In the same manner as that indicated in Example 8(c), 6.0 g. of 2,6-diethoxy-6-(trimethylsilylethynyl)-s-triazine (0.0226 mol) yields 2-ethynyl-4,6-diethoxy-s-triazine, melting point 87–89° C. (from ether-hexane).

The 2,4-diethoxy-6-(trimethylsilyl)-s-triazine used as the starting material is manufactured analogously to Example 8(b) from 10 g. of 2,4-dichloro-6-(trimethylsilylethynyl)-s-triazine (0.0406 mol) [see Example 8(a)] and 100 ml. of absolute ethanol, yielding 2,4-diethoxy-6-trimethylsilylethynyl)-s-triazine, boiling point 120–130° C./0.2 mm. Hg (bulb tube).

EXAMPLE 23

2-ethynyl-4-amino-6-methoxy-s-triazine 12 g. of 2,4-dimethoxy-6-(trimethylsilylethynyl)-s-triazine (0.0506 mol) [see Example 8(b)] in 500 ml. of liquid ammonia are stirred for 8 hours in a 1 l. sulphonation flask equipped with stirrer and solid carbon dioxide condenser, under refluxing ammonia (−33° C.). The ammonia is evaporated and the residue is recrystallised from methylene chloride-hexane, yielding 2-ethynyl-4-amino-6-methoxy-s-triazine, melting point 188° C. (with decomposition).

EXAMPLE 24

2-ethynyl-4-amino-6-methylthio-s-triazine

In the same manner as that indicated in Example 23, 8.2 g. of 2-methoxy-4-methylthio-6-(trimethylsilylethynyl)-s-triazine (0.0325 mol) [see Example 9(b)] yields 2-ethynyl-4-amino-6-methylthio-s-triazine, melting point 174–175° C. (with decomposition) (from acetone-hexane).

The examples which follow are intended to explain in more detail the preparation of pharmaceutical and cosmetic compositions. The active substances used are in particular the iodoethinyl compounds described as particularly valuable in the preceding text, and their pharmaceutically and cosmetically acceptable acid addition salts.

EXAMPLE 25

Hand disinfectant: a solution of 3.00 g. of active substance and 3.00 g. of sodium sulphoricinoleate in 47.00 g. of polyethylene glycol 400 and a solution of 7.00 g. of sodium dodecyl-sulphate in 39.85 g. of water are prepared, the two solutions are mixed and 0.15 g. of perfume is added to the mixture. The resulting liquid is dripped or sprayed onto the moist skin, and rubbed in.

EXAMPLE 26

Wound powder: 3.00 g. of active substance are thoroughly mixed with 5.0 g. of zinc oxide, 41.9 g. of rice starch and 50.0 g. of talc which in turn is impregnated with 0.1 g. of perfume, and the whole is sieved through a suitable fine sieve and again mixed well.

EXAMPLE 27

Wound ointment: 3.0 g. of active substance are ground with 3.0 g. of paraffin oil and introduced into a mixture of 10.0 g. of wool grease and 84.0 g. of white petroleum jelly which has been fused at a moderate temperature, and the mixture is allowed to cool whilst stirring.

EXAMPLE 28

Tablets for sucking, for disinfecting the mouth and throat: 50.0 g. of active substance are carefully mixed with 400.0 g. of castor sugar and at the same time moistened with a granulating solution of 8.0 g. of gelatine and 2.0 g. of glycerine in approx. 120 ml. of water. The mass is granulated through a suitable sieve, and dried. A sieved mixture of 3.0 g. of highly disperse silica, 4.0 g. of magnesium stearate, 0.7 g. of aroma substances and 42.3 g. of talc is added to the dry granules, the whole is thoroughly mixed and 1,000 tablets are produced from the mixture by pressing.

EXAMPLE 29

Concentrate for gargle: 5.0 g. of active substance are dissolved in 60.0 g. of 96% strength ethanol, 15.0 g. of glycerine and 0.3 g. of aroma substances are added and the solution is made up to 100.0 g. with 19.7 g. of distilled water. For gargling, approx. 5–20 drops of this concentrate in water are used.

EXAMPLE 30

Tablets for intestinal disinfection: to prepare 1,000 tablets each containing 150 mg. of active substance, 150.0 g. of active substance are first thoroughly mixed with 60.0 g. of corn starch and 35.0 g. of lactose and uniformly moistened with a granulating solution prepared from 5.0 g. of gelatine and 3.0 g. of glycerine in approx. 70 g. of water. The mass is granulated through a suitable sieve, and dried. The granules are thoroughly mixed with a sieved mixture of 15.0 g. of talc, 10.0 g. of dried corn starch and 2.0 g. of magnesium stearate and 1,000 tablets are prepared from the mixture by pressing.

EXAMPLE 31

Dragées for intestinal disinfection: to prepare 1,000 dragée centres, 150.0 g. of active substance are first thoroughly mixed with 60.0 g. of corn starch and 34.0 g. of lactose, the whole is mixed with a paste of 6.0 g. of starch, 3.0 g. of glycerine and approx. 54 g. of distilled water and the resulting mass is granulated through a suitable sieve, and dried. The granules are thoroughly mixed with a sieved mixture of 15.0 g. of talc, 10.0 g. of corn starch and 2.0 g. of magnesium stearate and 1,000 dragée centres each of 280 mg. are produced from the mixture by pressing.

The above centres are coated, in a dragée-coating kettle, with a layer of the following composition: shellac 2.000 g. gum arabic 7.500 g., dyestuff 0.180 g., highly disperse silica 2.000 g., talc 35.000 g. and sugar 58.320 g. 1,000 dragées each weighing 385 mg. and each containing 150 mg. of active substance are obtained.

EXAMPLE 32

2-iodoethynylpyridine

A suspension of sodium amide (prepared from 2.3 g. of sodium (0.1 mol)) in 700 ml. of liquid ammonia is manufactured in a 1.5 l. sulphonation flask equipped with stirrer and solid carbon dioxide condenser. The mixture is cooled to −60° C. and 10.3 g. of 2-ethinylpyridine (manufactured according to Leaver et al., J. Chem. Soc. 1963, 6053) are added. The mixture is stirred for 30 minutes at −60° C. and 25.4 g. of iodine (0.1 mol) are added in portions. The whole is stirred for three hours under reflux (−33° C.) and 100 ml. of a 5% strength aqueous sodium thiosulphate solution are added whilst stirring. The product which has precipitated is filtered off and washed with two 15 ml. portions of water. The crude product is recrystallised from chloroform-petroleum ether, whereupon 2-iodoethynylpyridine, melting point 127–128° C., is obtained.

EXAMPLE 33

2-iodoethynylpyridine hydrochloride

Dry hydrogen chloride is passed for 5 minutes into a solution of 1.0 g. of 2-iodoethynylpyridine (0.00436 mol) in 20 ml. of dry methylene chloride at 25° C. The mixture is evaporated to dryness in vacuo and recrystallised from a mixture of methanol and ether, and yields 2-iodoethynylpyridine hydrochloride, melting point (with decomposition) 135° C.

EXAMPLE 34

4-iodoethynyl-2-methoxypyrimidine hydrochloride

Dry gaseous hydrochloric acid is passed at room temperature into a solution of 1.0 g. of 4-iodoethynyl-2-methoxypyrimidine in 50 ml. of methylene chloride, until a precipitate forms (approx. 5 minutes). The precipitate is filtered off and washed with 30 ml. of methylene chloride. The filter residue 4-iodoethynyl-2-methoxypyrimidine hydrochloride, is dried at 12 mm. Hg over phosphorus pentoxide, melting point ~300° C. (decomp.).

EXAMPLE 35

4-ethynyl-2-chloropyrimidine

If the reaction of sodium acetylide with 2-chloropyrimidine is carried out in accordance with Example 6(a), but in the presence of atmospheric oxygen, 4-ethynyl-2-chloropyrimidine is obtained in addition to 2-chloro-4-ethynyl-3,4-dihydropyrimidine.

2-chloropyrimidine in 20 ml. of absolute ether is added to the sodium acetylide in liquid ammonia. After stirring for 2 hours, 2 g. of ammonia chloride is added and the ammonia is allowed to evaporate. The residue is taken up in water and the aqueous suspension is adjusted to pH 7 with 2 N hydrochloric acid. The aqueous phase is extracted 3 times with 200 ml. of ether at a time and the ether phases are combined, dried over 10 g. of anhydrous sodium sulphate and filtered. The ether solution is evaporated to dryness and the residue is applied to 10 preparative silica gel-coated plates (20 x 20 cm., layer thickness approx. 1 mm.). The coated plate is developed with a mixture of chloroform-benzene (4:1) and the rapidly migrating main zone ($R_f$~0.5) is removed from the plate. The silica gel powder is stirred with 500 ml. of chloroform, filtered off and the residue is washed with 200 ml. of chloroform. The filtrate is evaporated to dryness and yields 4-ethynyl-2-chloropyrimidine, melting point 131° C. (from ether).

EXAMPLE 36

2-chloro-4-iodoethynylpyrimidine (from 2-chloro-4-trimethylsilylethynyl-pyrimidine)

In the same manner as that indicated in Example 1, 1.21 g. of iodine (0.00475 mol) and 1.0 g. of 2-chloro-4-trimethylsilylpyrimidine (0.00475 mol) (for manufacture, see Example 20) in 50 ml. of liquid ammonia yields 2-chloro-4-iodoethynylpyrimidine, melting point 194–195° C. (from acetone), identical with a sample obtained according to Example 6.

EXAMPLE 37

2-chloro-4-iodoethynylpyrimidine (from 2-chloropyrimidine)

250 ml. of anhydrous ammonia is condensed in a 1 l. sulphonation flask equipped with stirrer, thermometer and dropping funnel. A vigorous stream of purified acetylene is passed in and 6.9 g. of sodium (0.3 mol) are added in portions in such a way that the blue colour immediately disappears. The suspension of sodium acetylide thus obtained is cooled to −60° C. whilst stirring. A solution of 27.5 g. of 2-chloropyrimidine (0.24 mol) (Org. Synth. Coll., vol. 4, 182) in 180 ml. of absolute ether is added dropwise from the dropping funnel over the course of 30 minutes. The mixture is stirred for 4 hours under reflux (−33° C.) and then cooled to −70° C. 122 g. of iodine (0.48 mol) are aded and 350 ml. of absolute ether are introduced. The mixture is stirred for 12 hours under reflux (−33° C.), 320 ml. of a 5% strength aqueous thiosulphate solution are added and the ammonia is evaporated. The residue is filtered off and washed with water and yields 2-chloro-4-iodoethynylpyrimidine, melting point 194–195° C. (from acetone).

EXAMPLE 38

4-iodoethynyl-2-methoxypyrimidine (from 2-chloro-4-iodoethynylpyrimidine

A solution of sodium methylate manufactured from 9.6 mg. of sodium and 2 ml. of methanol is added to a warm (45° C.) solution of 100 mg. of 2-chloro-4-iodoethynylpyrimidine (Example 6) in 10 ml. of methanol. The solution is left to stand for 30 minutes at 35° C. and is evaporated to dryness on a rotary evaporator. The residue is added to 10 g. of ice. The mixture is extracted with three 20 ml. portions of methylene chloride. The methylene chloride phases are each washed once with 5 ml. of water and then combined, dried over 10 g. of anhydrous sodium sulphate and filtered. The filtrate is evaporated to dryness on a rotary evaporator. The residue is recrystallised from methylene chloride and yields 4-iodoethynyl-2-methoxy-pyrimidine, melting point approx. 180° C. (with decomposition).

EXAMPLE 39

3-iodoethynylquinoline

In the same manner as that indicated in Example 1, 0.80 g. of iodine (0.00314 mol) and 0.48 g. of 3-ethynylquinoline (0.00314 mol) [manufactured according to Hawg and Fürst, Chem. Ber. 93, 593 (1960)] in 50 ml. of liquid ammonia yield 3-iodoethynylquinoline, melting point 182° C. (with decomposition) (from methylene chloride-hexane).

We claim:
1. A member selected from the group consisting of a compound which is of the Formula I(a)

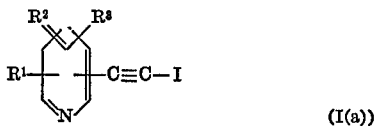

(I(a))

in which $R^1$, $R^2$ and $R^3$, which may be the same or different, each denotes a hydrogen or halogen atom or a lower alkyl, lower alkoxy, lower alkylthio, trifluoromethyl or amino group, and halogen or a therapeutically acceptable acid addition salt thereof.

2. A compound accordng to claim 1 which is 2-iodoethynylpyridine.

3. A compound according to claim 1 which is 3-iodoethynylpyridine.

4. A compound according to claim 1 which is 4-iodoethynylpyridine.

References Cited

UNITED STATES PATENTS 3,673,190   6/1972   Seiber et al. _____ 260—290

HARRY I. MOATZ, Primary Examiner

U.S. Cl. X.R.

260—248 CS, 249.5, 249.8, 250 A, 250 R, 251 R, 251 Q, 256.4 N, 256.5 R, 283 R, 288 R, 289 R, 294.8 G, 296 R, 297 R; 424—249, 250, 251, 258, 263

UNITED STATES PATENT OFFICE
CERTIFICATE OF CORRECTION

Patent No. 3,778,441              Dated December 11, 1973

Inventor(s) Urs Burckhardt et al

It is certified that error appears in the above-identified patent and that said Letters Patent are hereby corrected as shown below:

Column 25, the upper portion of the formula should read:

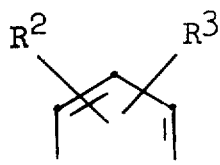

Signed and sealed this 4th day of June 1974.

(SEAL)
Attest:

EDWARD M. FLETCHER, JR.
Attesting Officer

C. MARSHALL DANN
Commissioner of Patents